US009088896B2

(12) United States Patent
Bravo et al.

(10) Patent No.: US 9,088,896 B2
(45) Date of Patent: *Jul. 21, 2015

(54) MOBILE DEVICE PASSWORD RESET (71) Applicant: International Business Machines Corporation, Armonk, NY (US)

(72) Inventors: Jose F. Bravo, Mamaroneck, NY (US); Jeffery L. Crume, Raleigh, NC (US); Nigel C. P. Hinds, Upper Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,705

(22) Filed: Nov. 14, 2013

(65) Prior Publication Data

US 2015/0072648 A1    Mar. 12, 2015

Related U.S. Application Data (63) Continuation of application No. 14/020,937, filed on Sep. 9, 2013.

(51) Int. Cl.
*H04B 1/60* (2006.01)
*H04B 7/15* (2006.01)
(Continued)

(52) U.S. Cl.
CPC ............ *H04W 12/08* (2013.01); *H04L 63/06* (2013.01); *H04L 63/083* (2013.01)

(58) Field of Classification Search
CPC ..... H04W 12/06; H04W 63/08; H04W 12/12; H04W 12/00; H04W 12/08; H04M 1/67; H04M 1/673; H04M 3/42314

USPC ......... 455/10, 11, 414.1–420; 726/19, 1, 2, 3, 726/4; 340/571

See application file for complete search history.

(56) References Cited

U.S. PATENT DOCUMENTS

2003/0088633 A1* 5/2003 Chiu et al. .................... 709/206
2011/0159844 A1 6/2011 Gillet et al.
(Continued)

OTHER PUBLICATIONS

Unknown, "Automatic Mobile Phone Unlock Beyond a Predetermined Call Duration Threshold of a Trusted Call", IP.com Prior Art Database Technical Disclosure, IPCOM000224591D, Jan. 2, 2013, 2 pages.

(Continued)

*Primary Examiner* — Kashif Siddiqui
*Assistant Examiner* — Ather Mohiuddin
(74) *Attorney, Agent, or Firm* — Dan Simek; Hoffman Warnick LLC (57) ABSTRACT The disclosure is directed to a device password reset. A method in accordance with an embodiment includes: receiving a phone call at a locked mobile device from a phone having a privileged phone number; initiating a password reset in response to the receipt of the phone call from the privileged phone number and the phone call exceeding a predetermined time duration threshold by: terminating, by the locked mobile device, the phone call from the phone having the privileged phone number; generating, by the locked mobile device, a temporary password; establishing, by the locked mobile device, a connection to the phone having the privileged phone number; displaying, by the locked mobile device, a password entry field; communicating, by the locked mobile device, the temporary password via the connection to the phone having the privileged phone number; and unlocking the locked mobile device upon successful entry of the temporary password in the password entry field displayed by the locked mobile device.

20 Claims, 6 Drawing Sheets (51) Int. Cl.
    *G06F 7/04*     (2006.01)
    *H04W 12/08*     (2009.01)
    *H04L 29/06*     (2006.01)

(56) References Cited

U.S. PATENT DOCUMENTS

2014/0085048 A1*   3/2014   Hadizad ........................ 340/5.64
2014/0113593 A1*   4/2014   Zhou et al. .................... 455/411

OTHER PUBLICATIONS

U.S. Appl. No. 14/020,937, Notice of Allowance Feb. 18, 2015, 8 pages.
U.S. Appl. No. 14/020,937, Non-Final Office Action Jan. 23, 2015, 13 pages.
Notice of Allowance and Fee(s) Due for U.S. Appl. No. 14/020,937, dated Feb. 18, 2015, 8 pages.

* cited by examiner

MOBILE DEVICE PASSWORD RESET

REFERENCE TO PRIOR APPLICATIONS

The current application is a continuation application of U.S. Utility application Ser. No. 14/020,937, which was filed on 9 Sep. 2013, which is hereby incorporated by reference.

TECHNICAL FIELD

The present invention relates generally to mobile devices, and more particularly, to a mobile device password reset.

RELATED ART

Many methods are available for resetting a forgotten or lost password of a mobile device. One method, typically referred to as a master or factory reset, returns a mobile device to its original, default operating system state. However, this process erases all data (e.g., contacts, applications, personalized settings, etc.) added to the mobile device after purchase. Another method requires a phone call to the phone company that provides service to the mobile device. The present invention addresses these problems allowing users to avoid the data reconstruction of a hard reset and the cost of service provider involvement.

SUMMARY

A first aspect of the invention provides a device password reset method, comprising: receiving a phone call at a locked mobile device from a phone having a privileged phone number; initiating a password reset in response to the receipt of the phone call from the phone having the privileged phone number and the phone call exceeding a predetermined time duration threshold, the password reset comprising: terminating, by the locked mobile device, the phone call from the privileged phone number; generating, by the locked mobile device, a temporary password; establishing, by the locked mobile device, a connection to the phone having the privileged phone number; displaying, by the locked mobile device, a password entry field; communicating, by the locked mobile device, the temporary password via the connection to the phone having the privileged phone number; and unlocking the locked mobile device upon successful entry of the temporary password in the password entry field displayed by the locked mobile device.

A second aspect of the invention provides a device configured to perform a password reset method, the method comprising: receiving a phone call at a locked mobile device from a phone having a privileged phone number; initiating a password reset in response to the receipt of the phone call from the phone having the privileged phone number and the phone call exceeding a predetermined time duration threshold, the password reset comprising: terminating, by the locked mobile device, the phone call from the privileged phone number; generating, by the locked mobile device, a temporary password; establishing, by the locked mobile device, a connection to the phone having the privileged phone number; displaying, by the locked mobile device, a password entry field; communicating, by the locked mobile device, the temporary password via the connection to the phone having the privileged phone number; and unlocking the locked mobile device upon successful entry of the temporary password in the password entry field displayed by the locked mobile device.

A third aspect of the invention provides a computer program product including program code embodied in at least one computer-readable storage medium, which when executed, enables a computer system to implement a device password reset method, the method comprising: receiving a phone call at a locked mobile device from a phone having a privileged phone number; initiating a password reset in response to the receipt of the phone call from the phone having the privileged phone number and the phone call exceeding a predetermined time duration threshold, the password reset comprising: terminating, by the locked mobile device, the phone call from the privileged phone number; generating, by the locked mobile device, a temporary password; establishing, by the locked mobile device, a connection to the phone having the privileged phone number; displaying, by the locked mobile device, a password entry field; communicating, by the locked mobile device, the temporary password via the connection to the phone having the privileged phone number; and unlocking the locked mobile device upon successful entry of the temporary password in the password entry field displayed by the locked mobile device.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

The present invention relates generally to mobile devices, and more particularly, to a mobile device password reset.

When a mobile device enters a locked state, operation of the mobile device may be prevented or severely limited. Such a locked state may occur automatically, for example, after a predetermined period of inactivity, or may be activated manually (e.g., via buttons/keys on the mobile device or remotely over the Internet). Typically, the locked state of a mobile device is provided as a security measure to prevent unauthorized or unintended use of the mobile device. However, while in the locked state, most mobile devices allow incoming phone calls, which can be answered by a user of the mobile device, and/or a user of the mobile device may be able to place an outgoing emergency call.

To unlock a mobile device that has entered a locked state, a user typically enters a password into a password entry screen of the mobile device using a virtual or physical keypad of the mobile device. A password may comprise, for example, an alphanumeric passcode, passkey, passphrase, access code, personal identification number (PIN), a pattern entered on the screen, or other type of authentication data. If the user correctly enters the password within a predetermined number of attempts, the mobile device is unlocked and full functionality is restored. Repeated failures to enter the correct password may, in some cases, cause the mobile device to erase all data and perform a master reset.

The present invention provides a mobile device password reset that allows a user to securely regain full authorized access to a locked mobile device. In the present disclosure, such a mobile device may include, for example, a cell phone, smartphone, tablet computer, PDA, laptop computer, or other handheld computing/communication device capable of sending/receiving phone calls.

Figure 1:
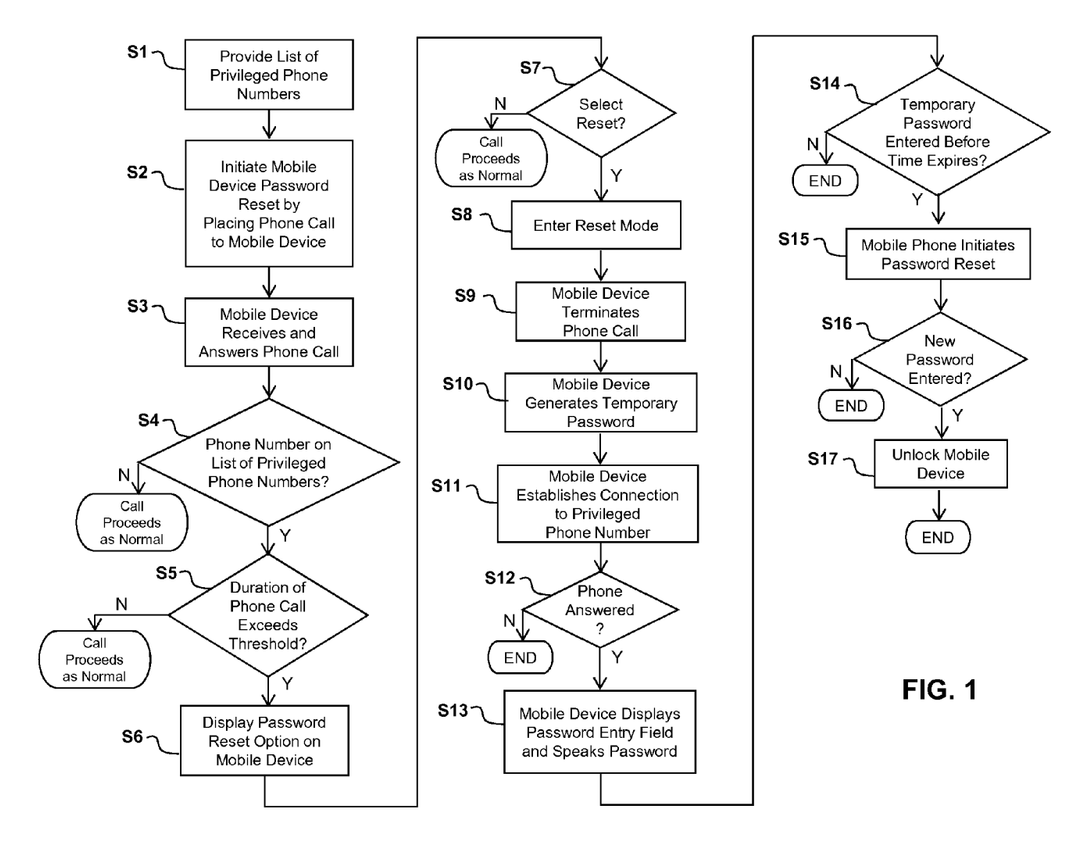
FIG. 1 shows a flow diagram of an illustrative process for a mobile device password reset, according to embodiments.
Figure 2:
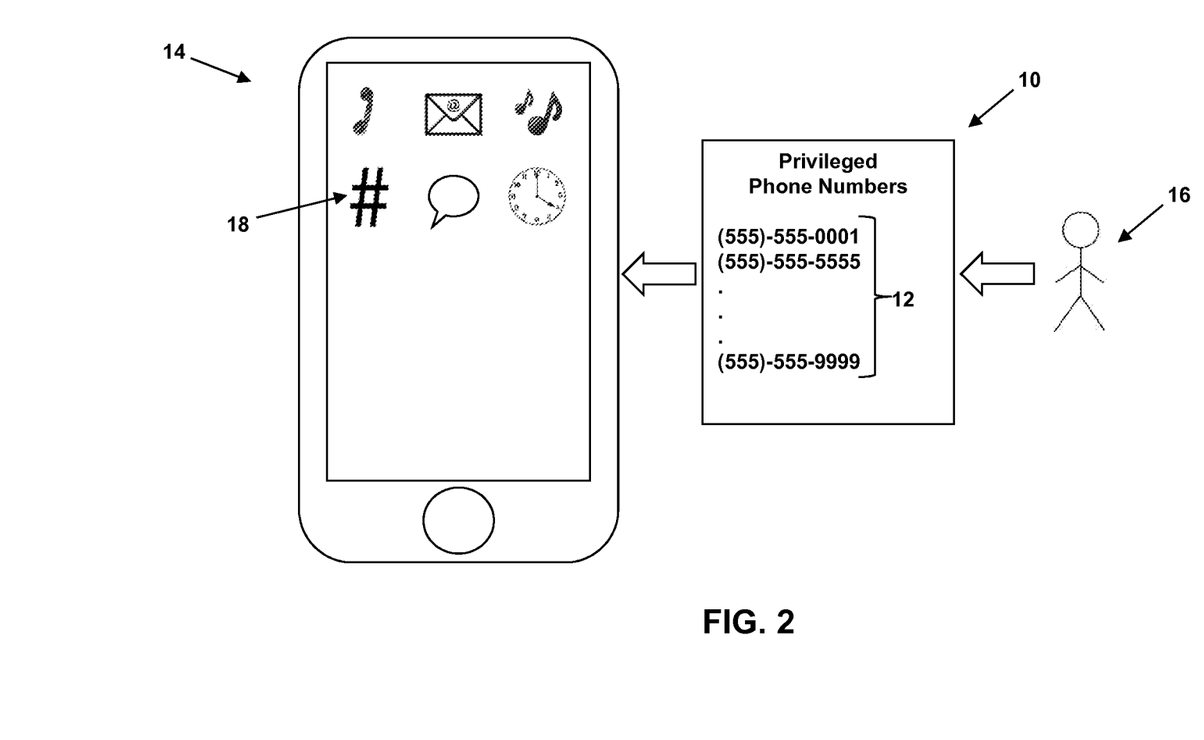
FIG. 2 depicts an illustrative setup process for a mobile device password reset, according to embodiments.

FIG. 1 shows a flow diagram of an illustrative process for a mobile device password reset according to embodiments. During a setup process S1, and as depicted in FIG. 2, a predefined list 10 of one or more privileged phone numbers 12 is provided and stored in a mobile device 14 by an authorized user 16 (e.g., owner) of the mobile device 14. For example, the predefined list 10 of privileged phone numbers 12 may include the home and work phone numbers of the user 16, a friend's cell phone number, a relative's land-line phone number, etc.

The user 16 may provide the predefined list 10 of privileged phone numbers 12 during an initial or subsequent configuration of the settings of the mobile device 14. Application software 18 loaded and running on the mobile device 14 may also be used to provide the predefined list 10 of privileged phone numbers 12 to the mobile device 14.

Figure 3:
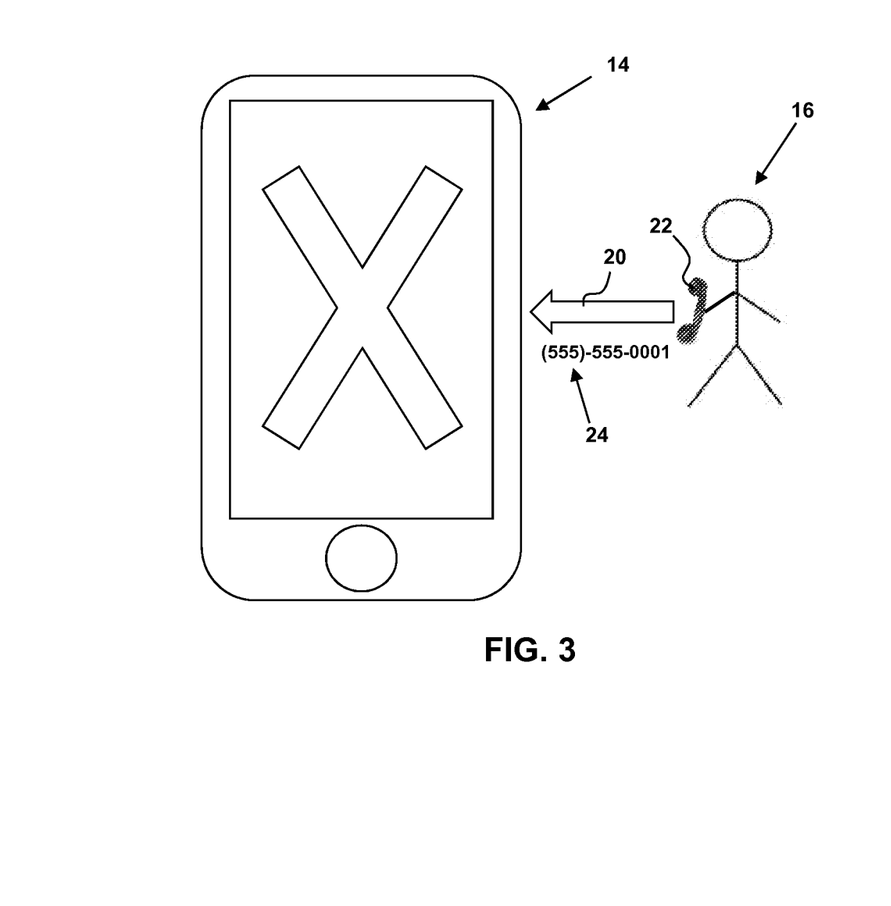
FIG. 3 depicts a user initiating a mobile device password reset by placing a phone call to a locked mobile device, according to embodiments.

At S2, assuming the mobile device 14 is in a locked state and the user 16 has forgotten the password for unlocking the mobile device 14, the user 16 initiates a mobile device password reset by placing a phone call 20 (FIG. 3) to the mobile device 14 from another phone 22. The phone 22 can comprise any telecommunication device capable of sending/receiving phone calls, including a mobile device, a land-line phone, a computer with VoIP capabilities, and/or the like. At S3, the phone call 20 is received and answered by the mobile device 14.

At S4, the mobile device 14 compares (FIG. 4) the phone number 24 of the phone call 20 to the privileged phone numbers 12 on the predefined list 10. The phone number 24 of the phone call 20 may be determined via caller ID or using any other suitable technique.

Figure 4:
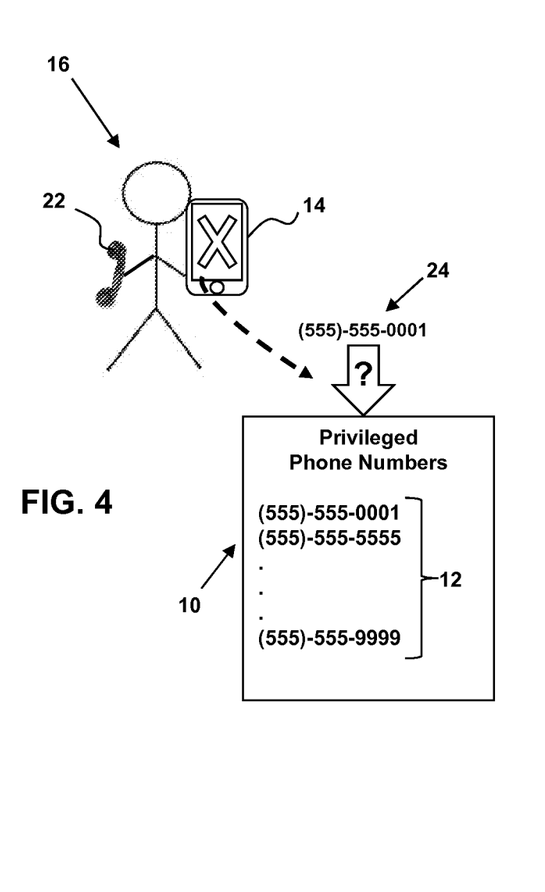
FIG. 4 depicts a locked mobile device comparing the phone number of a received phone call to privileged phone numbers on a predefined list, according to embodiments.

If the phone number 24 of the phone call 20 is not on the predefined list 10 of privileged phone numbers 12 (N at S4), the mobile device password reset process ends and the call proceeds as normal. If, however, the phone number 24 of the phone call 20 is on the predefined list 10 of privileged phone numbers 12 (Y at S4), flow passes to S5.

At S5, the elapsed duration of the phone call 20 is monitored by the mobile device 14. If the elapsed duration of the phone call 20 exceeds a predetermined time threshold (e.g., 10-15 seconds) (Y at S5), indicating that the phone call 20 has a high likelihood of being legitimate, a password reset option 26 (FIG. 5) is displayed to the user 16 at S6 via a display 28 of the mobile device 14. If the phone call 20 is terminated before the predetermined time threshold has been exceeded (N at S5), the mobile device password reset process ends and the call proceeds as normal. The duration of the phone call 20 will generally be shorter in the case that the mobile device 14 is lost/stolen. In such a case, the user 16 would realize the mobile device 14 has been compromised (e.g., based on who answered the mobile device 14) and hang-up before the predetermined time threshold, thereby terminating the mobile device password reset process.

Figure 5:
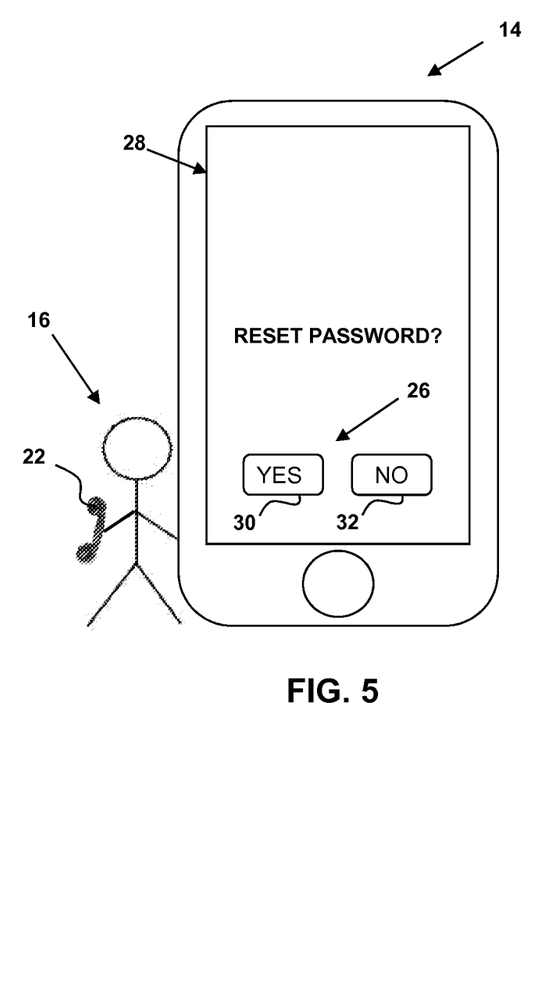
FIG. 5 depicts the display of a password reset option to a user via a display of a mobile device, according to embodiments.

If the user 16 selects the password reset option 26 (Y at S7), the mobile device 14 enters a password reset mode at S8. If the user 16 does not select the password reset option 26 (N at S7), the mobile device password reset process ends and the call proceeds as normal. Selection of the password reset option 26 may be provided, for example, via YES and NO buttons 30, 32, respectively, or in any other suitable manner.

Upon entering the password reset mode at S8, the mobile device 14 terminates the phone call 20 at S9. Thereafter, at S10, the mobile device 14 generates a random, one-time, temporary password 34 (FIG. 6).

Figure 6:
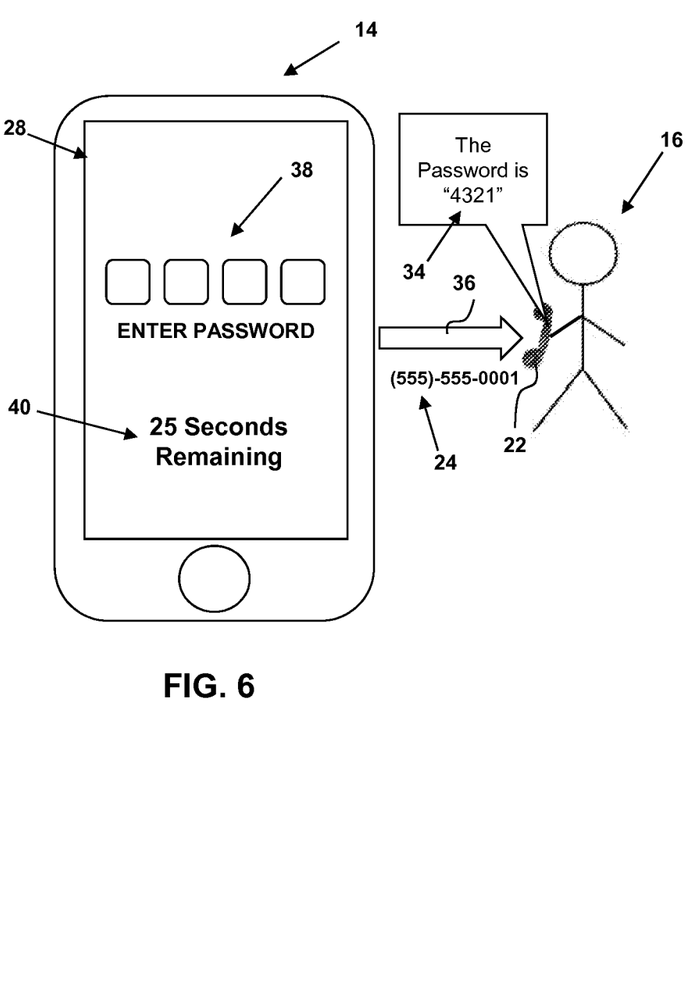
FIG. 6 depicts a mobile device placing a return phone call to the phone number of the phone that initiated a mobile device password reset, according to embodiments.

At S11, and as shown in FIG. 6, the mobile device 14 establishes a connection (e.g., via a return phone call 36) to the phone number 24 of the phone 22 that initiated the mobile device password reset. If the return phone call 36 is not answered by the user 16 (N at S12) the mobile device password reset process ends. If the return phone call 36 is answered by the user 16 (Y at S12), the mobile device 14, at S13, displays a password entry field 38 and speaks the temporary password 34 to the user 16 (e.g., using text-to-speech) one or more times for a predetermined period of time (e.g., 30 seconds). In other embodiments, the mobile device 14 may communicate the temporary password 34 to the user 16 in a non-vocal manner. For example, the mobile device 14 may communicate the temporary password 34 to the user 16 via a short message service (SMS) text message, an email, and/or the like.

If the user 16 does not enter the correct temporary password 34 into the displayed password entry field 38 within the predetermined period of time (N at S14), the mobile device password reset process ends. If the user 16 enters the correct temporary password 34 into the displayed password entry field 38 within the predetermined period of time (Y at S14), flow passes to S15. As depicted in FIG. 6, a timer 40 may be displayed on the mobile device 14 to indicate the time remaining during which the user 16 can enter the correct temporary password 34 into the displayed password entry field 38.

Figure 7:
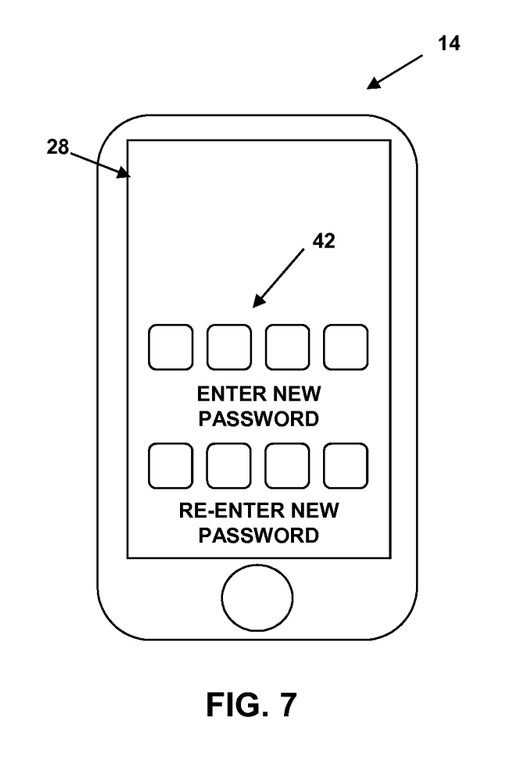
FIG. 7 depicts the initiation of a password reset upon receiving a correct temporary password, according to embodiments.

At S15, upon receiving the correct temporary password 34, the mobile device 14 immediately initiates a password change process (FIG. 7), after which the user 16 is required to enter a new password 42 into the mobile device 14. After successful completion of the password change process (Y at S16), the mobile device 14 is unlocked at S17 and is ready for use. If the password reset is not completed (N at S16), the mobile device 14 remains locked and the mobile device password reset process ends. In this case, the user 16 must return to S2 to restart the mobile device password reset process.

Figure 8:
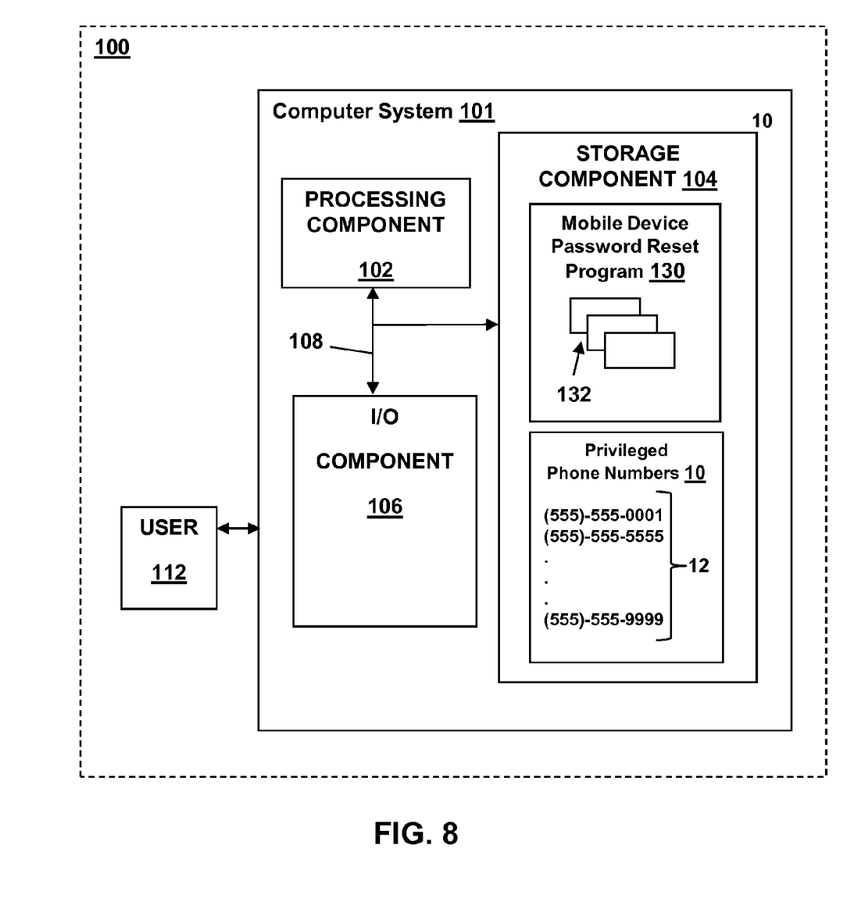
FIG. 8 shows an illustrative environment for a mobile device password reset according to an embodiment.

An illustrative environment 100 for providing a mobile device password reset is shown in FIG. 8. The environment 100 includes at least one computer system 101 and a mobile device password reset program 130 that can perform processes described herein in order to provide a mobile device password reset in accordance with embodiments. The environment 100 may be provided, for example, within a mobile device 14.

The computer system 101 is shown including a processing component 102 (e.g., one or more processors), a storage component 104 (e.g., a storage hierarchy), an input/output (I/O) component 106 (e.g., one or more I/O interfaces and/or devices), and a communications pathway 108. In general, the processing component 102 executes program code, such as the mobile device password reset program 130, which is at least partially fixed in the storage component 104. While executing program code, the processing component 102 can process data, such as a list 10 of privileged phone numbers 12 and/or the like, which can result in reading and/or writing transformed data from/to the storage component 104 and/or the I/O component 106 for further processing. The pathway 108 provides a communications link between each of the components in the computer system 101. The I/O component 106 can include one or more human I/O devices, which enable a human user 112 to interact with the computer system 101 and/or one or more communications devices to enable a system user 112 to communicate with the computer system 101 using any type of communications link. To this extent, the mobile device password reset program 130 can manage a set of interfaces (e.g., graphical user interface(s), application program interfaces, communication interface(s), and/or the like) that enable human and/or system users 112 to interact with the mobile device password reset program 130. Furthermore, the mobile device password reset program 130 can manage (e.g., store, retrieve, create, manipulate, organize, present, etc.) the data, such as the list 10 of privileged phone numbers 12 and/or the like, using any solution.

The computer system 101 can include one or more general purpose computing articles of manufacture (e.g., computing devices) capable of executing program code, such as the mobile device password reset program 130, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the mobile device password reset program 130 can be embodied as any combination of system software and/or application software.

Furthermore, the mobile device password reset program 130 can be implemented using a set of modules 132. In this case, a module 132 can enable the computer system 20 to perform a set of tasks used by the mobile device password reset program 130, and can be separately developed and/or implemented apart from other portions of the mobile device password reset program 130. As used herein, the term "component" means any configuration of hardware, with or without software, which implements the functionality described in conjunction therewith using any solution, while the term "module" means program code that enables a computer system 101 to implement the actions described in conjunction therewith using any solution. When fixed in a storage component 104 of a computer system 101 that includes a processing component 102, a module is a portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 101.

When the computer system 101 includes multiple computing devices, each computing device can have only a portion of the mobile device password reset program 130 fixed thereon (e.g., one or more modules 132). However, it is understood that the computer system 101 and the mobile device password reset program 130 are only representative of various possible equivalent computer systems that may perform a process described herein. To this extent, in other embodiments, the functionality provided by the computer system 101 and the mobile device password reset program 130 can be at least partially implemented by one or more computing devices that include any combination of general and/or specific purpose hardware with or without program code. In each embodiment, the hardware and program code, if included, can be created using standard engineering and programming techniques, respectively.

When the computer system 101 includes multiple computing devices, the computing devices can communicate over any type of communications link. Furthermore, while performing a process described herein, the computer system 101 can communicate with one or more other computer systems using any type of communications link. In either case, the communications link can include any combination of various types of optical fiber, wired, and/or wireless links; include any combination of one or more types of networks; and/or utilize any combination of various types of transmission techniques and protocols.

While shown and described herein as a method and system for detecting illegal activity through interpersonal relationship resolution, it is understood that aspects of the invention further provide various alternative embodiments. For example, in one embodiment, the invention provides a computer program fixed in at least one computer-readable storage medium, which when executed, enables a computer system to for detect illegal activity through interpersonal relationship resolution. To this extent, the computer-readable storage medium includes program code, such as the mobile device password reset program 130, which enables a computer system to implement some or all of a process described herein. It is understood that the term "computer-readable storage medium" includes one or more of any type of tangible medium of expression, now known or later developed, from which a copy of the program code can be perceived, reproduced, or otherwise communicated by a computing device. For example, the computer-readable medium can include: one or more portable storage articles of manufacture; one or more memory/storage components of a computing device; paper; and/or the like.

Another embodiment of the invention provides a method of providing a copy of program code, such as the mobile device password reset program 30, which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

Still another embodiment of the invention provides a method for providing a mobile device password reset. In this case, a computer system, such as the computer system 101, can be obtained (e.g., created, maintained, made available, etc.) and one or more components for performing process(es) described herein can be obtained (e.g., created, purchased, used, modified, etc.) and deployed to the computer system. To this extent, the deployment can include one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A password reset method, comprising:
   receiving a phone call at a locked mobile device from a phone having a privileged phone number;
   initiating a password reset in response to the receipt of the phone call from the phone having the privileged phone number and the phone call exceeding a predetermined time duration threshold;
   displaying a password reset option on the locked mobile device in response to the initiation of the password reset; and
   selecting the password reset option to perform the password reset, the password reset comprising:
      terminating, by the locked mobile device, the phone call from the privileged phone number;
      generating, by the locked mobile device, a temporary password;
      establishing, by the locked mobile device, a connection to the phone having the privileged phone number;
      displaying, by the locked mobile device, a password entry field;
      communicating, by the locked mobile device, the temporary password via the connection to the phone having the privileged phone number; and
      unlocking the locked mobile device upon successful entry of the temporary password in the password entry field displayed by the locked mobile device.

2. The password reset method of claim 1, wherein the connection comprises a phone call.

3. The password reset method of claim 1, wherein the connection comprises a text message.

4. The password reset method according to claim 1, wherein the unlocking further comprises:
   initiating, by the mobile device, a timer when communicating the temporary password via the connection to the phone having the privileged phone number; and
   unlocking the locked mobile device upon successful entry of the temporary password in the displayed password entry field within a predetermined period of time as determined via the timer.

5. The password reset method according to claim 1, wherein the unlocking further comprises:
   requesting, by the locked mobile device, a new password upon successful entry of the temporary password in the displayed password entry field; and
   unlocking the locked mobile device upon successful entry of the new password.

6. The password reset method according to claim 1, wherein the communicating further comprises:
   speaking, by the locked mobile device, the temporary password during the connection.

7. The password reset method according to claim 1, further comprising:
   storing at least one privileged phone number in the mobile device.

8. The password reset method according to claim 7, wherein the initiating the password reset further comprises:
   comparing a phone number of the received phone call to each of the privileged phone numbers stored in the mobile device; and
   initiating the password reset when the phone number of the received phone call matches one of the privileged phone numbers stored in the mobile device.

9. A device configured to perform a password reset method, the method comprising:
   receiving a phone call at a locked mobile device from a phone having a privileged phone number;
   initiating a password reset in response to the receipt of the phone call from the phone having the privileged phone number and the phone call exceeding a predetermined time duration threshold;
   displaying a password reset option on the locked mobile device in response to the initiation of the password reset; and
   selecting the password reset option to perform the password reset, the password reset comprising:
      terminating, by the locked mobile device, the phone call from the privileged phone number;
      generating, by the locked mobile device, a temporary password;
      establishing, by the locked mobile device, a connection to the phone having the privileged phone number;
      displaying, by the locked mobile device, a password entry field;
      communicating, by the locked mobile device, the temporary password via the connection to the phone having the privileged phone number; and
      unlocking the locked mobile device upon successful entry of the temporary password in the password entry field displayed by the locked mobile device.

10. The device of claim 9, wherein the connection comprises a phone call.

11. The device of claim 9, wherein the connection comprises a text message.

12. The device according to claim 9, wherein the unlocking further comprises:
    initiating, by the mobile device, a timer when communicating the temporary password via the connection to the phone having the privileged phone number; and
    unlocking the locked mobile device upon successful entry of the temporary password in the displayed password entry field within a predetermined period of time as determined via the timer.

13. The device according to claim 9, wherein the unlocking further comprises:
    requesting, by the locked mobile device, a new password upon successful entry of the temporary password in the displayed password entry field; and
    unlocking the locked mobile device upon successful entry of the new password.

14. The device according to claim 9, wherein the communicating further comprises:
    speaking, by the locked mobile device, the temporary password during the connection.

15. The device according to claim 9, the method further comprising:

storing at least one privileged phone number in the mobile device.

16. The device according to claim 15, wherein the initiating the password reset further comprises:
   comparing a phone number of the received phone call to each of the privileged phone numbers stored in the mobile device; and
   initiating the password reset when the phone number of the received phone call matches one of the privileged phone numbers stored in the mobile device.

17. A computer program product comprising program code embodied in at least one non-transitory computer-readable storage medium, which when executed, enables a computer system to implement a device password reset method, the method comprising:
   receiving a phone call at a locked mobile device from a phone having a privileged phone number;
   initiating a password reset in response to the receipt of the phone call from the phone having the privileged phone number and the phone call exceeding a predetermined time duration threshold;
   displaying a password reset option on the locked mobile device in response to the initiation of the password reset; and
   selecting the password reset option to perform the password reset, the password reset comprising:
      terminating, by the locked mobile device, the phone call from the privileged phone number;
      generating, by the locked mobile device, a temporary password;
      establishing, by the locked mobile device, a connection to the phone having the privileged phone number;
      displaying, by the locked mobile device, a password entry field;
      communicating, by the locked mobile device, the temporary password via the connection to the phone having the privileged phone number; and
      unlocking the locked mobile device upon successful entry of the temporary password in the password entry field displayed by the locked mobile device.

18. The computer program product of claim 17, wherein the connection comprises a phone call, a text message, or an email.

19. The computer program product of claim 17, wherein the unlocking further comprises:
   initiating, by the mobile device, a timer when communicating the temporary password via the connection to the phone having the privileged phone number; and
   unlocking the locked mobile device upon successful entry of the temporary password in the displayed password entry field within a predetermined period of time as determined via the timer.

20. The computer program product of claim 17, wherein the unlocking further comprises:
   requesting, by the locked mobile device, a new password upon successful entry of the temporary password in the displayed password entry field; and
   unlocking the locked mobile device upon successful entry of the new password.

* * * * *